US012000076B2

(12) United States Patent
Shinde et al.

(10) Patent No.: US 12,000,076 B2
(45) Date of Patent: Jun. 4, 2024

(54) FRONT LOAD WASHER WITH LOCKING BOLT REMOVAL CONFIRMATION

(71) Applicant: Haier US Appliance Solutions, Inc., Wilmington, DE (US)

(72) Inventors: Jay Pareshbhai Shinde, Hyderabad (IN); Sanjana Tuniki, Hyderabad (IN); Neki Jashwant Patel, Hyderabad (IN); Sanjay Yadav Majjath, Hyderabad (IN); Sasikumar Durairaj, Hyderabad (IN)

(73) Assignee: Haier US Appliance Solutions, Inc., Wilmington, DE (US)

( * ) Notice: Subject to any disclaimer, the term of this patent is extended or adjusted under 35 U.S.C. 154(b) by 226 days.

(21) Appl. No.: 17/688,973

(22) Filed: Mar. 8, 2022

(65) Prior Publication Data
US 2023/0287619 A1    Sep. 14, 2023

(51) Int. Cl.
*D06F 37/26* (2006.01)
*D06F 34/28* (2020.01)
*D06F 37/04* (2006.01)
*D06F 39/00* (2020.01)

(52) U.S. Cl.
CPC ............ *D06F 37/267* (2013.01); *D06F 34/28* (2020.02); *D06F 37/04* (2013.01); *D06F 39/001* (2013.01); *F16B 2200/95* (2023.08)

(58) Field of Classification Search
CPC .................................................. D06F 37/267
See application file for complete search history.

(56) References Cited

U.S. PATENT DOCUMENTS 6,843,628 B1    1/2005    Hoffmeister et al.

FOREIGN PATENT DOCUMENTS

| CN | 106436151 A | 2/2017 |
| JP | 2018128049 A | 8/2018 |
| KR | 20060007263 A | 1/2006 |
| WO | WO2020225054 A1 | 11/2020 |

OTHER PUBLICATIONS

Miele, "Operating and Installation Instructions Washer W 3038", 56 pages.

*Primary Examiner* — Jason Y Ko
(74) *Attorney, Agent, or Firm* — Dority & Manning, P.A.

(57) ABSTRACT

A laundry appliance includes a cabinet, a tub, and a control panel for accepting inputs directing functionality of the laundry appliance. When movement of the laundry appliance is necessary, such as upon initial delivery, laundry appliance includes one or more shipping attachment assemblies comprising a shipping bolt and shipping bolt spacer, which connect to attachment elements of the tub and serve to stabilize the tub while laundry appliance is moved. The laundry appliance further includes identifiers for each shipping attachment assembly. The identifiers are only visible upon removal of the shipping attachment assembly. When moving of the laundry appliance is complete, the shipping attachment assemblies are removed, revealing the identifiers. The identifiers are provided through a network to ensure removal of the shipping attachment assemblies. Once all identifiers are accounted for, a sequence of inputs is provided that, when properly entered using the control panel of the laundry appliance, enables operation of the laundry appliance.

20 Claims, 8 Drawing Sheets

FRONT LOAD WASHER WITH LOCKING BOLT REMOVAL CONFIRMATION

FIELD OF THE INVENTION

The present subject matter relates generally to the front-load laundry appliances, and more particularly to an apparatus and methods for ensuring removal of locking bolts and spacers prior to use.

BACKGROUND OF THE INVENTION

Laundry appliances are generally assembled at a central location and then shipped to a destination for installation. Shipping of front-loading laundry appliances, in particular, presents risk of damage to the suspension of the laundry appliance drum and other elements of the laundry appliance. Damage to the drum suspension may result in balancing problems when the laundry appliance is put into operation. These balancing problems can result in serious damage to the laundry appliance.

Conventional front-loading laundry appliances address this problem by securing shipping bolts and spacers through a side of the laundry appliance and attaching them to the drum. This effectively stabilizes the drum during transport. However, it is not uncommon for installers or end users to forget or otherwise fail to remove the shipping bolts prior to operation of the laundry appliance. Operation of the laundry appliance without removing the shipping bolts often results in excessive shaking of the unit, causing loud noise and potentially damaging the laundry appliance. Similarly, even if the shipping bolts are removed, failure to remove the spacers will also cause issues with noise and excessive shaking of the laundry appliance during operation.

In some conventional front-laundry appliances, this problem was addressed by attaching cord holders to each shipping bolts and threading the power cord through the cord holders. This was intended to encourage removal of the shipping bolts to access the power cord after shipping and prior to operation. However, the cord holders were made of material that could be cut and therefore did not require removal of the shipping bolts and spacers.

Accordingly, a front-load laundry appliance and methods for ensuring removal of shipping bolts and spacers prior to operation of the unit is desirable.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a front-loading laundry appliance is provided. The laundry appliance may define a vertical direction, a lateral direction, and a transverse direction and may include a cabinet, a tub provided within the cabinet, a control panel, a shipping attachment assembly, an identifier, and a controller. The cabinet may include a rear side. The tub may have an attachment element. The control panel may include a plurality of input selectors for selecting machine cycles and features. The shipping attachment assembly may be detachably connected to the attachment element of the tub through the rear side of the cabinet. The shipping attachment assembly may further include a shipping bolt spacer and a shipping bolt. The shipping bolt spacer may have an exterior surface defining an internal spacer chamber. The shipping bolt may be located within the spacer chamber. The identifier may be visible from the exterior of the laundry appliance only upon detachment of the shipping attachment assembly from the attachment element. The controller may be in communication with the control panel and input selectors. The controller may further be configured to receive a series of sequential inputs from the plurality of input selectors, compare the series of sequential inputs to a predetermined input pattern, and enable operation of the laundry appliance when the series of sequential inputs matches the predetermined input pattern. The predetermined input patter may be associated with the identifier.

In another exemplary aspect of the present disclosure, a front-loading laundry appliance is provided. The laundry appliance may define a vertical direction, a lateral direction, and a transverse direction and may include a cabinet, a tub provided within the cabinet, a control panel, a bracket, a shipping attachment assembly, an identifier, and a controller. The cabinet may include a rear side. The tub may have an attachment element. The control panel may include a plurality of input selectors for selecting machine cycles and features. The bracket may be attached to the rear side of the cabinet for stabilizing the cabinet. The shipping attachment assembly may be detachably connected to the attachment element of the tub through the rear side of the cabinet. The shipping attachment assembly may further include a shipping bolt spacer and a shipping bolt. The shipping bolt spacer may have an exterior surface defining an internal spacer chamber. The shipping bolt may be located within the spacer chamber. The identifier may be visible from the exterior of the laundry appliance only upon detachment of the shipping attachment assembly from the attachment element. The controller may be in communication with the control panel and input selectors. The controller may further be configured to receive a series of sequential inputs from the plurality of input selectors, compare the series of sequential inputs to a predetermined input pattern, and enable operation of the laundry appliance when the series of sequential inputs matches the predetermined input pattern. The predetermined input patter may be associated with the identifier.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
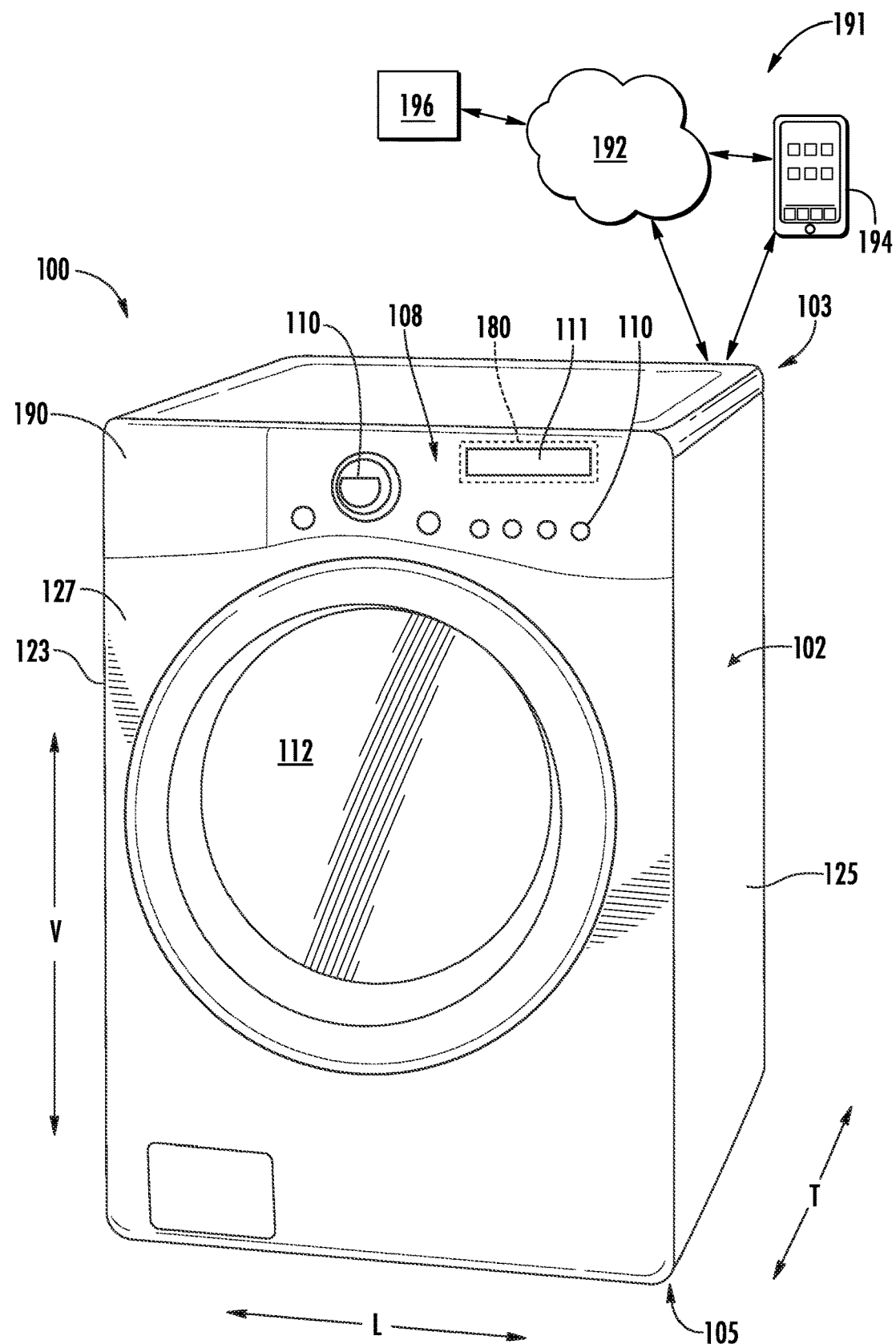
FIG. 1 provides a front perspective view of a laundry appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
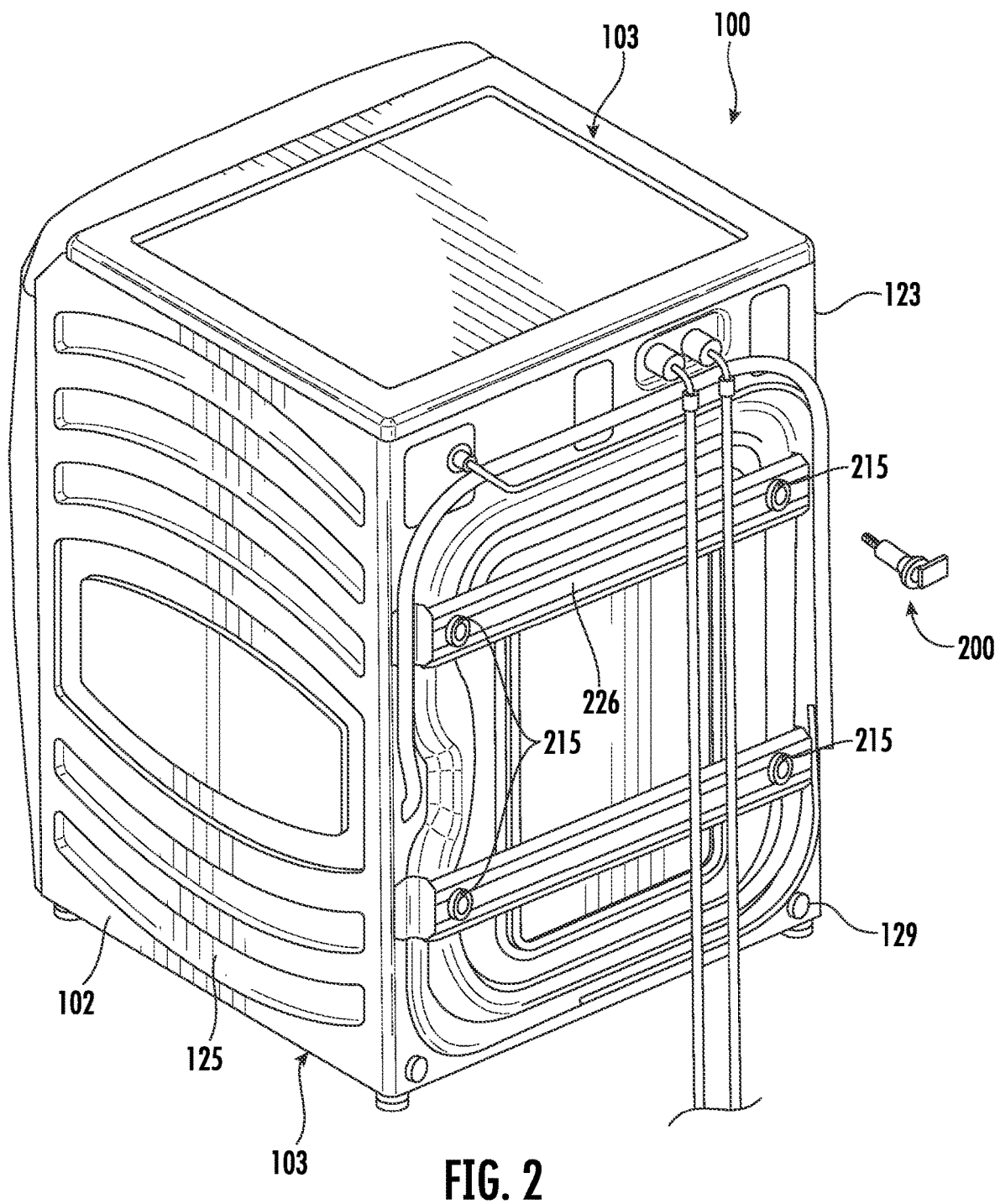
FIG. 2 provides a rear perspective view of a laundry appliance according to exemplary embodiments of the present disclosure.
Figure 3:
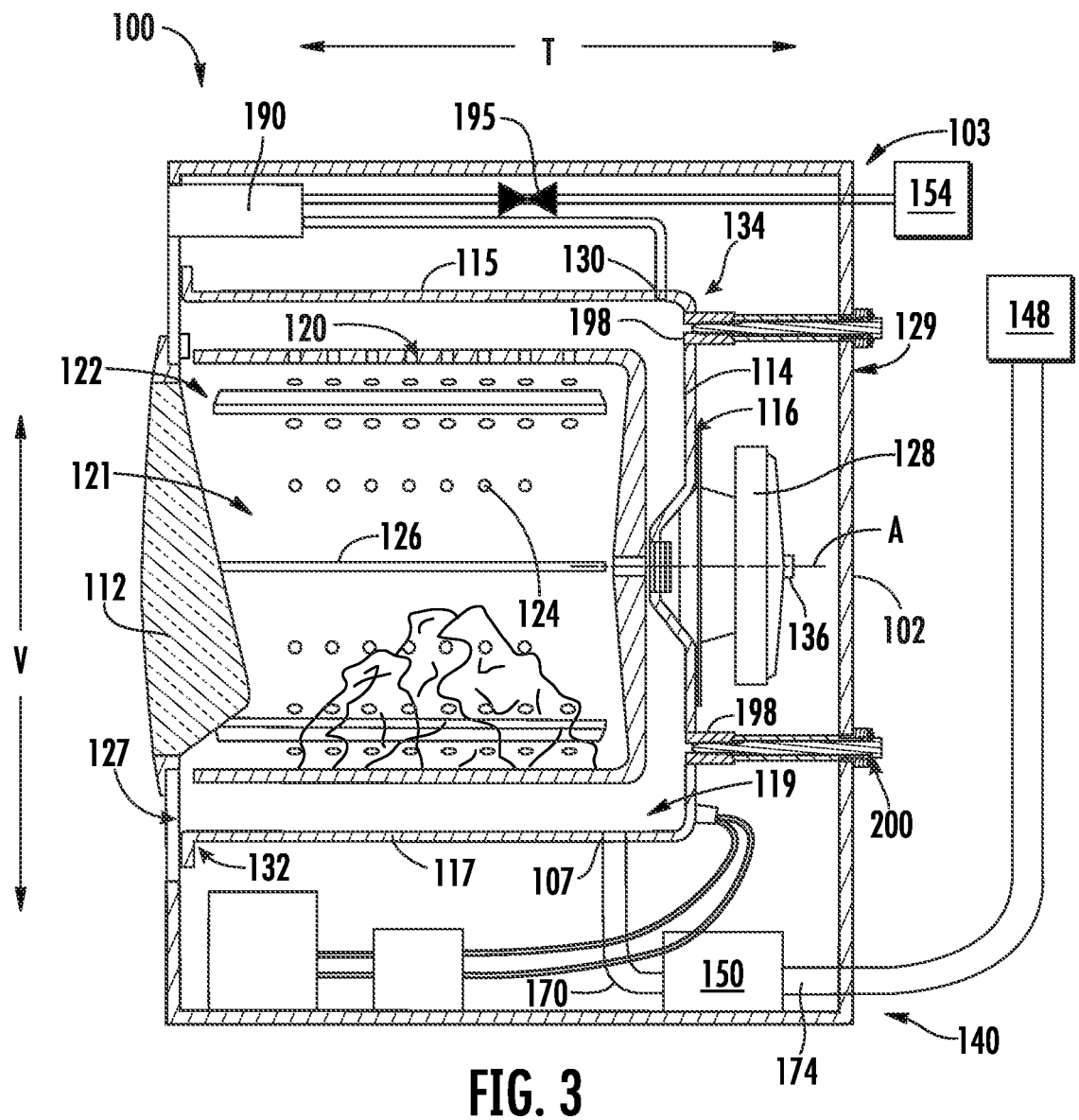
FIG. 3 provides a side schematic view of the exemplary laundry appliance of FIGS. 1 and 2.

FIGS. 1 through 3 provide various views of an exemplary horizontal axis, front-loading laundry appliance 100 according to one exemplary embodiment of the present disclosure. For instance, laundry appliance 100 may perform each of a wash cycle or operation and a drying cycle or operation. In particular, FIG. 1 provides a front, perspective view of horizontal axis laundry appliance 100. FIG. 2 provides a rear, perspective view of horizontal axis laundry appliance 100. FIG. 3 provides a side, cross-section view of laundry appliance 100. As shown in FIG. 1, laundry appliance 100 includes a cabinet 102 that extends between a top 103 and a bottom 105, e.g., along a vertical direction V. Cabinet 102 also extends between a first side 123 and a second side 125, e.g., along a lateral direction L, and between a front 127 and a rear 129, e.g., along a transverse direction T. The vertical, lateral, and transverse directions V, L, T defined by laundry appliance 100 are mutually perpendicular and together define an orthogonal direction system.

A door 112 is mounted to the front 127 of cabinet 102 and is rotatable between an open position (not shown) facilitating access to a wash drum or basket 120 (FIG. 2) located within cabinet 102, and a closed position (shown in FIGS. 1 and 3) hindering access to basket 120.

A control panel 108 including a plurality of input selectors 110 is coupled to the front 127 of cabinet 102. Control panel 108 and input selectors 110 collectively form a user interface input for operator selection of machine cycles and features. For example, in some embodiments, control panel 108 includes a display 111 (FIG. 1) configured to present or indicate selected features, a countdown timer, and/or other items of interest to machine users.

As shown in FIG. 3, a tub 114 defines a wash fluid compartment 119 configured for receipt of a washing fluid. Thus, tub 114 is configured for containing washing fluid, e.g., during operation of laundry appliance 100 (e.g., a wash cycle or operation). Washing fluid disposed within tub 114 may include, for example, at least one of water, fabric softener, bleach, and detergent. Tub 114 includes a back wall 116 and a sidewall (not pictured) and extends between a top 115 and a bottom 117, e.g., along the vertical direction V. Further, tub 114 extends between a front 132 and a rear 134, e.g., along the transverse direction T.

Basket 120 is rotatably mounted within tub 114 in a spaced apart relationship from the tub sidewall and tub back wall 116. One or more bearing assemblies may be placed between basket 120 and tub 114 and may allow for rotational movement of basket 120 relative to tub 114. Basket 120 defines a wash chamber 121 and an opening 122. Opening 122 of basket 120 permits access to wash chamber 121 of basket 120, e.g., in order to load articles into basket 120 and remove articles from basket 120. Basket 120 also defines a plurality of perforations 124 to facilitate fluid communication between an interior of basket 120 and tub 114. A sump 107 is defined by tub 114 and is configured for receipt of a washing fluid volume during operation of appliance 100. For example, during operation of appliance 100 (e.g., the wash cycle), washing fluid may be urged by gravity from basket 120 to sump 107 through plurality of perforations 124.

A spout 130 is configured for directing a flow of fluid into tub 114, thus forming a tub inlet. Spout 130 may be in fluid communication with a water supply (not shown) in order to direct fluid (e.g., clean water) into tub 114. A pump assembly 150 (shown schematically in FIG. 3) is located beneath tub 114 for draining tub 114 of fluid. Pump assembly 150 is in fluid communication with sump 107 of tub 114 via a conduit 170, wherein sump 107 constitutes a tub outlet. Thus, conduit 170 directs fluid from tub 114 to pump assembly 150. Pump assembly 150 is also in fluid communication with a drain 140 via piping 174. Pump assembly 150 can urge fluid disposed in sump 107 to drain 140 during operation of appliance 100 in order to remove fluid from tub 114. Fluid received by drain 140 from pump assembly 150 is directed out of appliance 100, e.g., to a sewer or septic system 148. It should be understood that conduit 170 and piping 174 may be constructed of any suitable mechanism for directing fluid, e.g., a pipe, duct, conduit, hose, or tube, and are not limited to any particular type of mechanism.

A motor 128 is in mechanical communication with basket 120 in order to selectively rotate basket 120, e.g., during an agitation or a rinse cycle of laundry appliance 100 as described below. In particular, a shaft 136 mechanically couples motor 128 with basket 120 and drivingly rotates basket 120 about a shaft or central axis A, e.g., during a spin cycle. Ribs 126 extend from basket 120 into wash chamber 121. Ribs 126 assist agitation of articles disposed within wash chamber 121 during operation of laundry appliance 100. For example, ribs 126 may lift articles disposed in basket 120 during rotation of basket 120.

As further shown in FIG. 3, laundry appliance 100 includes a dispenser assembly 190. Dispenser assembly 190 includes features for receiving various wash treatment additives (e.g., fluid detergent, powder detergent, fabric softener, bleach, powder, or any other suitable liquid) and dispensing or directing them to wash fluid compartment 119 of tub 114 during operation of laundry appliance 100. Dispenser assembly 190 may include a drawer configured to store one or more of the various wash treatment additives. In detail, one or more of the additives may be added during either or both of a wash cycle and a drying cycle.

Operation of laundry appliance 100 may be controlled by a processing device or controller 180 (FIG. 1) that is operatively coupled to control panel 108 for user manipulation to select washing and/or drying cycles and features. In response to user manipulation of control panel 108, controller 180 may operate the various components of laundry appliance 100 to execute selected machine cycles and features.

Controller 180 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 180 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 108 and other components of laundry appliance 100 may be in communication with controller 180 via one or more signal lines or shared communication busses.

In addition, referring again to FIG. 3, laundry appliance 100 may generally include an external communication system 191 which is configured for enabling the user to interact with laundry appliance 100 using a remote device 194. Specifically, according to an exemplary embodiment, external communication system 191 is configured for enabling communication between a user, an appliance, and a remote server 196. According to exemplary embodiments, laundry appliance 100 may communicate with a remote device 194 either directly (e.g., through a local area network (LAN), Wi-Fi, Bluetooth, etc.) or indirectly (e.g., via a network 192), as well as with a remote server, e.g., to receive notifications, provide confirmations, input operational data, transmit sound signals and sound signatures, etc.

In general, remote device 194 may be any suitable device for providing and/or receiving communications or commands from a user. In this regard, remote device 194 may include, for example, a personal phone, a tablet, a laptop computer, or another mobile device. In addition, or alternatively, communication between the appliance and the user may be achieved directly through an appliance control panel (e.g., control panel 108). In general, network 192 can be any type of communication network. For example, network 192 can include one or more of a wireless network, a wired network, a personal area network, a local area network, a wide area network, the internet, a cellular network, etc. In general, communication with network may use any of a variety of communication protocols (e.g., TCP/IP, HTTP, SMTP, FTP), encodings or formats (e.g. HTML, XML), and/or protection schemes (e.g., VPN, secure HTTP, SSL).

External communication system 191 is described herein according to an exemplary embodiment of the present subject matter. However, it should be appreciated that the exemplary functions and configurations of external communication system 191 provided herein are used only as examples to facilitate description of aspects of the present subject matter. System configurations may vary, other communication devices may be used to communicate directly or indirectly with one or more appliances, other communication protocols and steps may be implemented, etc. These variations and modifications are contemplated as within the scope of the present subject matter.

In an illustrative example of operation of laundry appliance 100, laundry items are loaded into basket 120, and washing operation is initiated through operator manipulation of input selectors 110 (including display 111, if a touch screen is employed). Tub 114 is filled with water and one or more wash treatment additives from dispenser assembly 200 to form a wash fluid. One or more valves of a water inlet valve 195 can be actuated by controller 180 to provide for filling tub 114 to the appropriate level for the amount of articles being washed. Water inlet valve 195 is in fluid communication with a water source, such as e.g., a hot water heater and/or a municipal water line 154. Once tub 114 is properly filled with wash fluid, the contents of basket 120 are agitated with ribs 126 for cleansing of laundry items in basket 120.

After the agitation phase of the wash cycle is completed, tub 114 is drained. Laundry articles can then be rinsed by again adding wash fluid to tub 114 depending on the particulars of the cleaning cycle selected by a user, and ribs 126 may again provide agitation within wash chamber 121. One or more spin cycles may also be used. In particular, a spin cycle may be applied after the wash cycle and/or after the rinse cycle in order to wring wash fluid from the articles being washed. During a spin cycle, basket 120 is rotated at relatively high speeds.

Upon completion of the wash cycle, laundry appliance 100 may perform a drying cycle. For instance, after the spin cycle is completed and excess wash fluid and/or water has been drained from the tub, laundry appliance may begin the drying cycle (e.g., circulating air through tub 114 and/or wash chamber 121). The drying cycle may be performed automatically upon completion of the wash cycle, or may be initiated separately by the user upon the completion of the wash cycle. In at least one embodiment, the drying cycle commences automatically within a predetermined amount of time after the completion of the wash cycle (e.g., by utilizing additives provided in the dispenser assembly 190).

While described in the context of a specific embodiment of horizontal axis laundry appliance 100, it will be understood that horizontal axis laundry appliance 100 is provided by way of example only. Other laundry appliances having different configurations, different appearances, and/or different features may also be utilized with the present subject matter as well, including, for example, vertical axis laundry appliances. Thus, the teachings of the present disclosure are not limited to use with laundry appliance 100.

As shown in FIG. 3, laundry appliance 100 may further include one or more attachment elements 198 extending from the back wall 116 of tub 114. Attachment elements 198 may be female threaded connectors in the preferred embodiment, but one of ordinary skill will understand that alternative embodiments may include other conventional attachment hardware. Attachment elements 198 may be integral to tub 114 in certain embodiments. In alternative embodiments, attachment elements 198 may be separate from, but secured to, tub 114 by conventional means.

Shipping attachment assembly 200 is detachably connected to attachment element 198 through rear 129 of cabinet 102. In some embodiments, one or more brackets 226 (FIG. 2) may be included on the exterior rear 129 of cabinet 102 at least to aid in stabilizing laundry appliance 100 during transport. In such embodiments, shipping attachment assembly 200 may extend through both bracket 226 and rear 129 of cabinet 102 prior to attaching to attachment element 198.

Figure 4:
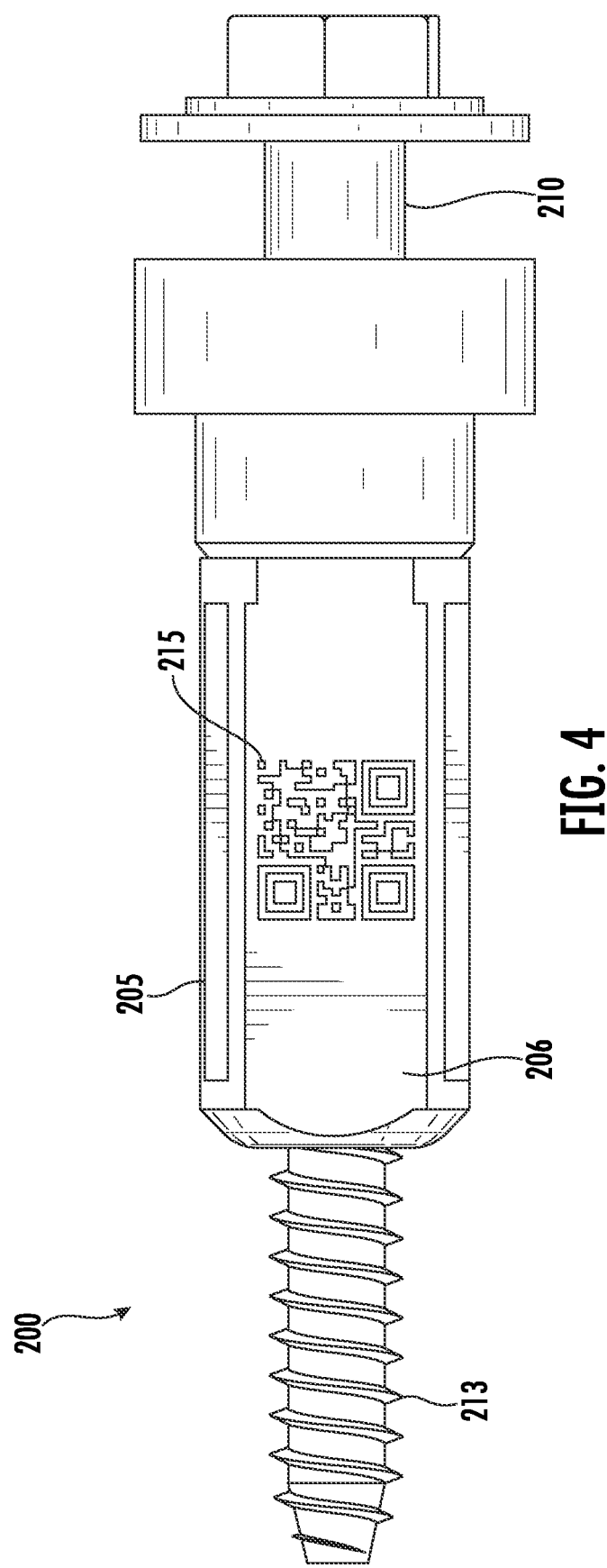
FIG. 4 provides a side view of a shipping attachment assembly according to exemplary embodiments of the present disclosure.

FIG. 4 provides a side view of shipping attachment assembly 200. Shipping attachment assembly 200 may include a shipping bolt spacer 205 and a shipping bolt 210. Shipping bolt spacer 205 and shipping bolt 210 are two separate components in the preferred embodiment of FIG. 4.

However, shipping bolt spacer 205 and shipping bolt 210 may form a single, integral unit in alternative embodiments.

Figure 5:
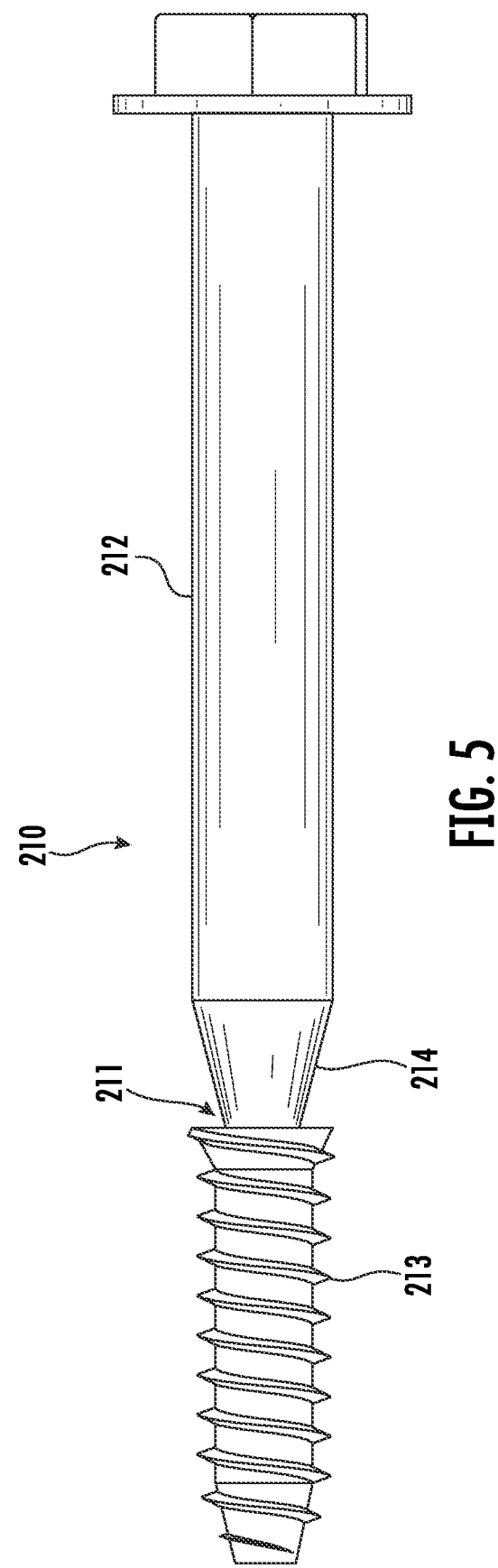
FIG. 5 provides a side view of a shipping bolt according to exemplary embodiments of the present disclosure.

FIG. 5 provides a side view of one embodiment of shipping bolt 210. Shipping bolt 210 may include a bolt body 212, a threaded portion 213, and a connecting portion 214. The connecting portion 214 of the shipping bolt 210 serves to connect the bolt body 212 to the threaded portion 213. Bolt body 212 may be substantially uniform in diameter along the entirety of its length. Connecting portion 214 may be tapered, have a diameter at the connection with bolt body 212 greater than the diameter at the connection with threaded portion 213 of shipping bolt 210. At the point of connection between connecting portion 214 and threaded portion 213 of shipping bolt 210, the diameter of threaded portion 213 is greater than the diameter of connecting portion 214. This increase in diameter from connecting portion 214 to threaded portion 213 defines a lip 211. Flanges 220 may be configured such that they flex radially outward upon the application of force in the direction from first end 216 to second end 218. Flanges 220 may further be elastic such that, upon relief from said force, flanges 220 return to their original position.

Figure 6:
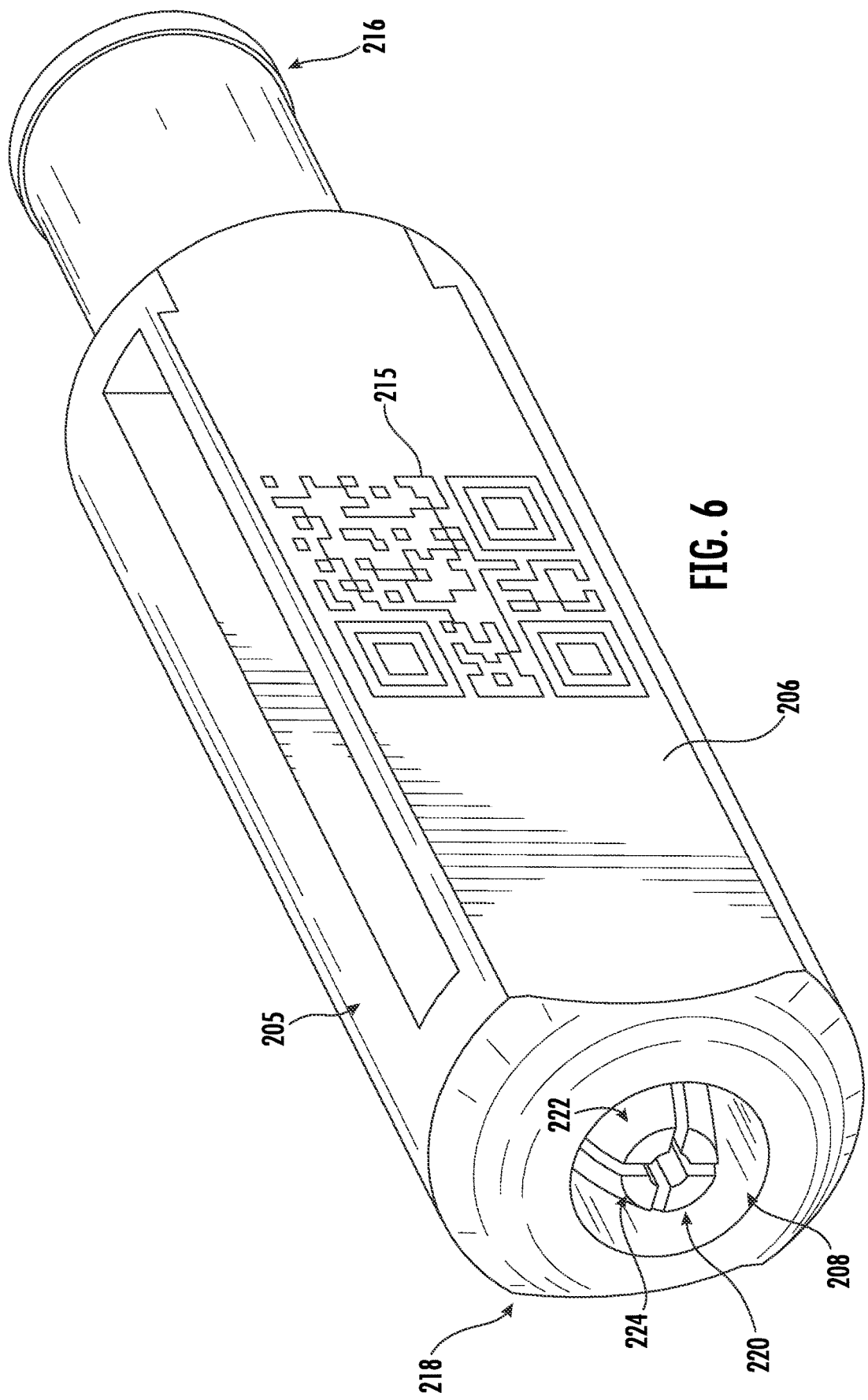
FIG. 6 provides a side view of a shipping bolt spacer according to exemplary embodiments of the present disclosure.

FIG. 6 provides a perspective view of one embodiment of shipping bolt spacer 205. Shipping bolt spacer 205 includes an exterior surface 206. The exterior surface 206 defines an internal spacer chamber or through hole 208 through which shipping bolt 210 may be inserted, as further discussed herein. Shipping bolt spacer 205 may include a first end 216 and a second end 218. The internal spacer chamber or through hole 208 may extend from first end 216 to second end 218. Shipping bolt spacer 205 may further include a plurality of flanges 220 situated at second end 218.

The plurality of flanges 220 may each include a first end 222 and a second end 224. First end 222 of each of the plurality of flanges 220 may be connected to shipping bolt spacer 205. In their unflexed position, the distance between second end 224 of each of the plurality of flanges 220 may be less than the diameter of threaded portion 213 of shipping bolt 210. Upon the application of force in the direction from first end 216 to second end 218 of shipping bolt spacer 205, the distance between second end 224 of each of the plurality of flanges 220 may be greater than the diameter of threaded portion 213 of shipping bolt 210.

Figure 7:
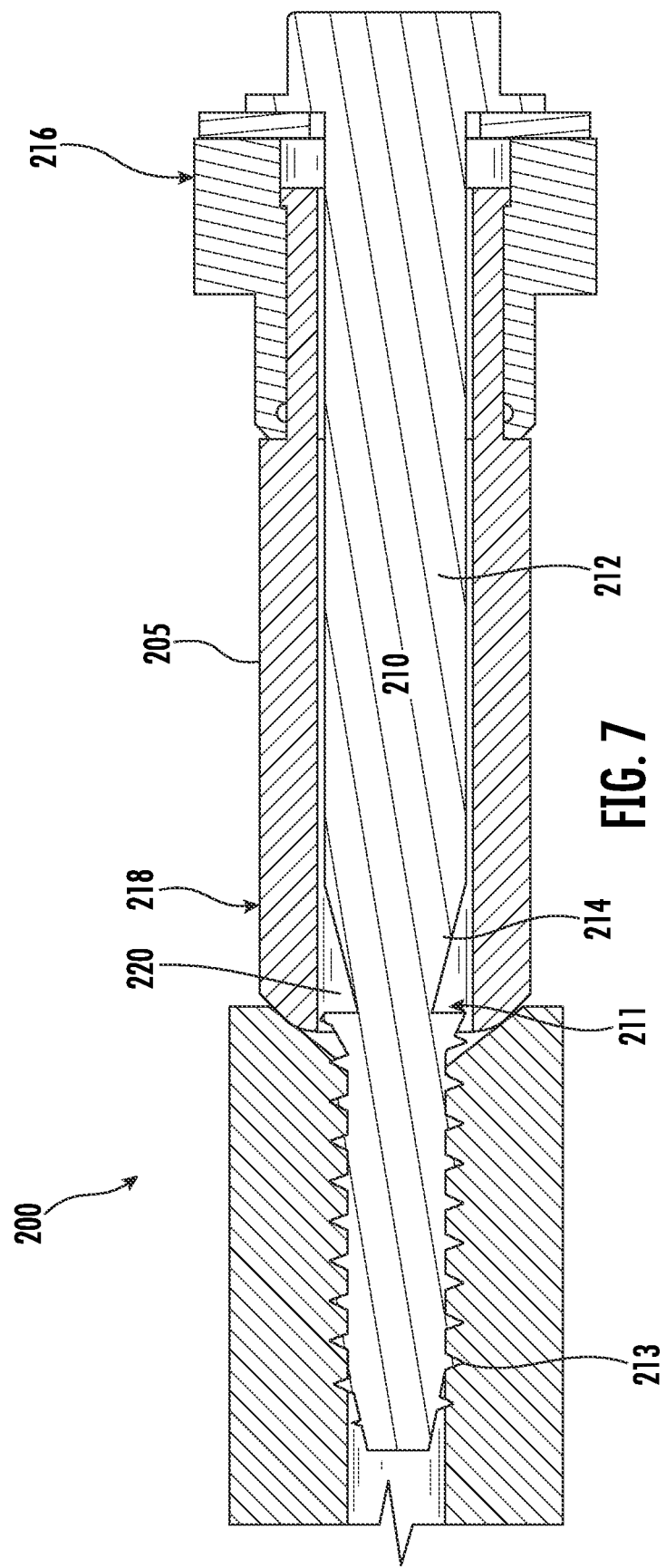
FIG. 7 provides a cross-sectional side view of a shipping attachment assembly according to exemplary embodiments of the present disclosure.

Referring now to FIGS. 4 and 7, in embodiments where shipping bolt 210 and shipping bolt spacer 205 are independent elements, shipping bolt 210 may be inserted into internal spacer chamber or through hole 208 beginning at first end 216 of shipping bolt spacer 205. Upon insertion, threaded portion 213 of shipping bolt 210 will contact flanges 220. By applying a force to shipping bolt 210 in the direction of second end 218 of shipping bolt spacer 205, flanges 220 flex radially outward, increasing the distance between second ends 224 of flanges 220 until the diameter exceeds the diameter of threaded portion 213 of shipping bolt 210, allow passage of shipping bolt 210 beyond flanges 220. Once threaded portion 213 of shipping bolt 210 passes flanges 220, flanges 220 are aligned with connecting portion 214 of shipping bolt 210. Connecting portion 214 of shipping bolt 210 has a diameter less than threaded portion 213 where those two elements meet. Accordingly, elastic flanges 220 revert radially inward, reducing the distance between second ends 224 of flanges 220 to a distance less than the diameter of threaded portion 213 of shipping bolt 210. As previously explained, the difference in diameter between threaded portion 213 and connecting portion 214, at the point those two elements meet, defines a lip 211. Second ends 224 of flanges 220 abut lip 211, preventing threaded portion 213 of shipping bolt 210 from traveling beyond flanges 220 in the direction of first end 216 of shipping bolt spacer 205. Threaded portion 213 of shipping bolt 210 may then be screwed into attachment element 198, securing shipping attachment assembly 200 to tub 114. Prior to operation of laundry appliance 100, shipping attachment assembly 200 may be detached from attachment element 198 of tub 114, for example by unscrewing shipping attachment assembly 200, to prevent excessive shaking of laundry appliance 100.

Laundry appliance 100 may further include an identifier 215. Generally, identifier 215 may be visible from the exterior of laundry appliance 100 only upon detachment of shipping attachment assembly 200 from attachment element 198. In the preferred embodiment, and as shown in FIG. 4, identifier 215 may located on exterior surface 206 of shipping bolt spacer 205. While shipping attachment assembly 200 is attached to attachment element 198, identifier 215 is within cabinet 102 and thus concealed from view. Only upon removal of shipping attachment assembly 200 does identifier 215 become visible. In alternative embodiments, such as shown in FIG. 2, identifier 215 may be situated on rear side 129 of cabinet 102, just above, below, or to the side of openings into which shipping attachment assembly 200 is inserted. Thus, shipping attachment assembly 200 conceals identifier 215 when attached to attachment element 198, but reveals identifier 215 when removed. In yet another embodiment, identifier 215 may be concealed behind one or more brackets 226, again necessitating removal of shipping attachment assembly 200 to obtain a view of identifier 215.

In the preferred embodiment, and as shown in FIG. 2, identifier 215 may be a QR code. However, identifier 215 is not so limited. Identifier 215, in alternative embodiments, may include a bar code, an alphabetic, numeric, or alphanumeric string, or some combination of these methods. Indeed, any other designator that could be used to verify removal of shipping attachment assembly 200 are intended to fall within the scope of the present disclosure.

Figure 8:
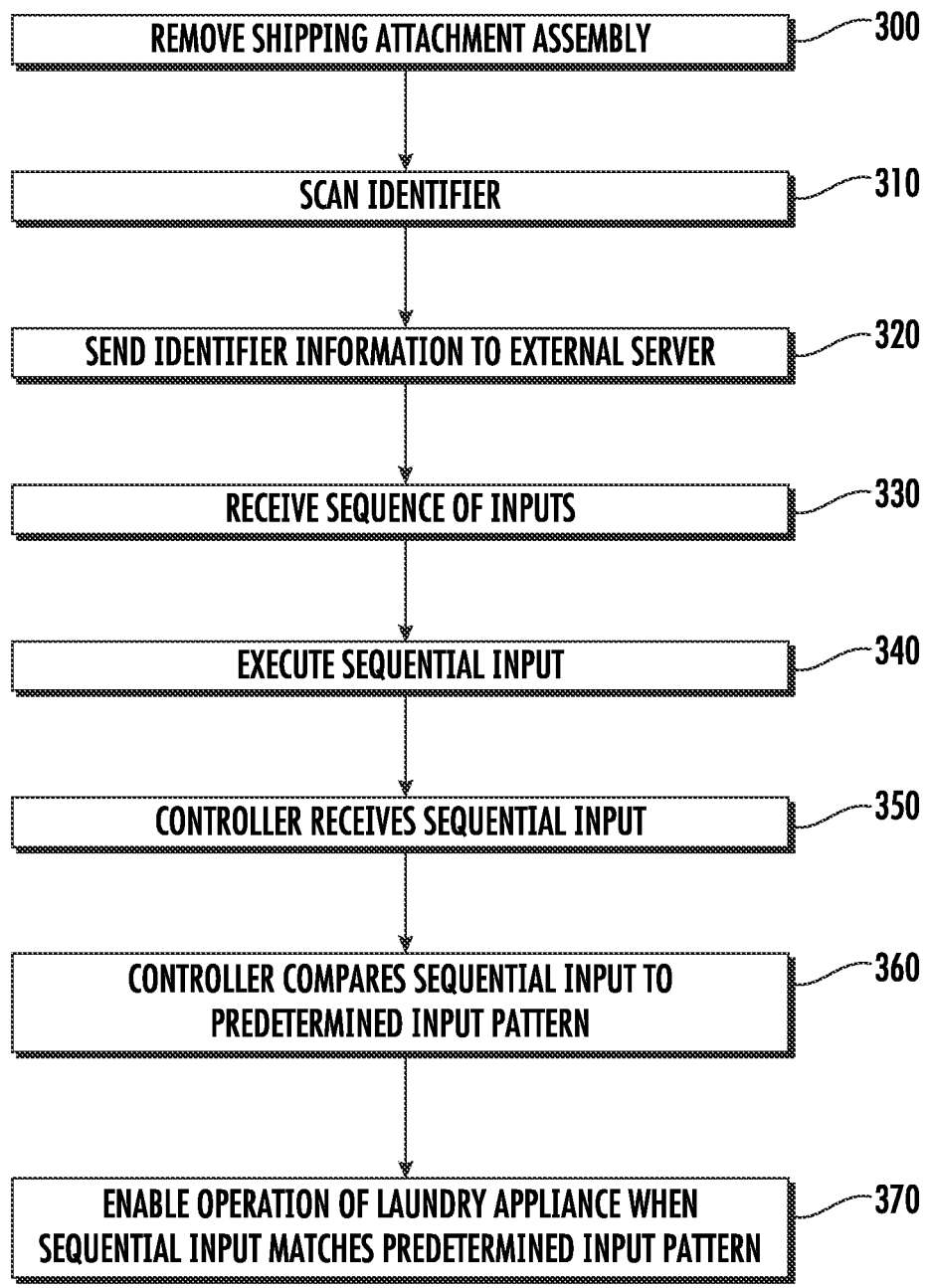
FIG. 8 provides a flow chart describing steps to enable operation of a laundry appliance according to exemplary embodiments of the present disclosure.

Referring now to FIG. 8, upon removal of shipping attachment assembly 200 at step 300, an installer or end user may scan identifier 215 using remote device 194 at step 310. Laundry appliance 100 may include a plurality of shipping attachment assemblies 200, and each shipping attachment assembly 200 may include its own identifier 215. It is preferred that each shipping attachment assembly 200 have a distinct identifier 215 to enable confirmation that all shipping attachment assemblies 200 have been removed, as further discussed herein. However, this is not strictly necessary to practice the present subject matter. Further, in some embodiments, depending on the type of identifier (e.g., QR code, bar code, alphanumeric string), scanning of identifier 215 may not be possible or desirable. For example, in embodiments where identifier 215 is an alphanumeric string, it may be preferable for the installer or end user to manually input the numbers and/or letters of the string into remote device 194. Other conventional means of recording identifier 215, such as photography, voice-to-text, etc. will be recognized by the skilled artisan.

At step 320, identifier information may be sent to a remote server 196. The identifier information may be identifier 215 itself or may be data representative of identifier 215. The remote device 194 may receive back a sequence of inputs that are based on the identifier information. For example, remote device 194 may receive back a sequence of buttons to press on control panel 108, such as "Temp," "Medium," "Soil," and "Normal." This combination is merely exemplary, of course. The sequence may include any number and combination of the interactive elements of control panel 108, input selectors 110, and display 111.

The installer or end user would then execute the sequential input at step 340 by actuating the control panel 108, input selectors 110, and/or display 111 of laundry appliance 100 in the combination provided. At step 350, controller 180 is configured to receive the sequential input from control panel 108 and plurality of input selectors 110 (including display 111), with which controller 180 is in communication. Controller 180 is further configured to compare the received sequential inputs to a predetermined input pattern at step 360. The predetermined input pattern is a fixed combination and order of potential inputs from control panel 108, input selectors 110, and or display 111. The predetermined input pattern may be hardwired into memory of laundry appliance 100. In alternative embodiments, laundry appliance 100 may receive the predetermined input pattern from remote server 196 or remote device 194 following step 320.

If controller 180 identifies a match between the sequential input and the predetermined input pattern, controller 180 is configured to enable operation of laundry appliance at step 370. If there is no match, inputs using control panel 108, input selectors 110, and/or display 111 will fail to provide the designated functionality.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A front-loading laundry appliance defining a vertical direction, a lateral direction, and a transverse direction, the laundry appliance comprising:
   a cabinet having a rear side;
   a tub provided within the cabinet having an attachment element;
   a control panel including plurality of input selectors for selecting machine cycles and features;
   a shipping attachment assembly detachably connected to the attachment element of the tub through the rear side of the cabinet, the shipping attachment assembly comprising
     a shipping bolt spacer have an exterior surface defining an internal spacer chamber;
     a shipping bolt within the spacer chamber;
   an identifier visible from the exterior of the laundry appliance only upon detachment of the shipping attachment assembly from the attachment element; and
   a controller in communication with the control panel and input selectors, wherein the controller is configured to:
     receive a series of sequential inputs from the plurality of input selectors;
     compare the series of sequential inputs to a predetermined input pattern, wherein the predetermined input pattern is associated with the identifier; and
     enable operation of the laundry appliance when the series of sequential inputs matches the predetermined input pattern.

2. The front-loading laundry appliance of claim 1, wherein the identifier is located on the exterior surface of the shipping bolt spacer.

3. The front-loading laundry appliance of claim 1, wherein the identifier is located on the rear side of the cabinet in a location concealed from view by the attached shipping attachment assembly.

4. The front-loading laundry appliance of claim 1, wherein the shipping bolt includes a bolt body, a threaded portion, and a connecting portion, the connecting portion connecting the bolt body to the threaded portion.

5. The front-loading laundry appliance of claim 4, wherein at the point of connection between the connecting portion and the threaded portion of the shipping bolt, the diameter of the threaded portion is greater than the diameter of the connecting portion such that the threaded portion defines a lip.

6. The front-loading laundry appliance of claim 5, wherein the shipping bolt spacer has a first end and a second end, a through hole extending from the first end to the second end, and a plurality of elastic flanges situated at the second end that are configured to flex radially outward upon the application of a force in the direction from the first end to the second end and to return to their original position in the absence of the application of such force.

7. The front-loading laundry appliance of claim 6, wherein each of the plurality of flanges includes a first end and a second end, the first end of each of the plurality of flanges connected to the shipping bolt space, and distance between each of the second ends of the plurality of flange being less than the diameter of the threaded portion of the shipping bolt such that the plurality of flanges prevent removal of the shipping bolt.

8. The front-loading laundry appliance of claim 1, wherein the identifier is a QR code.

9. The front-loading laundry appliance of claim 1, wherein the identifier is a bar code.

10. The front-loading laundry appliance of claim 1, wherein the identifier is an alpha-numeric code.

11. A front-loading laundry appliance defining a vertical direction, a lateral direction, and a transverse direction, the laundry appliance comprising:
    a cabinet having a rear side;
    a tub provided within the cabinet having an attachment element;
    a control panel including plurality of input selectors for selecting machine cycles and features;
    a bracket attached to the rear side of the cabinet for stabilizing the cabinet;
    a shipping attachment assembly detachably connected to the attachment element of the tub through the rear side of the cabinet and through the bracket, the shipping attachment assembly comprising
      a shipping bolt spacer have an exterior surface defining an internal spacer chamber;
      a shipping bolt within the spacer chamber;
    an identifier visible from the exterior of the laundry appliance only upon detachment of the shipping attachment assembly from the attachment element; and
    a controller in communication with the control panel and input selectors, wherein the controller is configured to:
      receive a series of sequential inputs from the plurality of input selectors;
      compare the series of sequential inputs to a predetermined input pattern, wherein the predetermined input pattern is associated with the identifier; and enable operation of the laundry appliance when the series of sequential inputs matches the predetermined input pattern.

12. The front-loading laundry appliance of claim 11, wherein the identifier is located on the exterior surface of the shipping bolt spacer.

13. The front-loading laundry appliance of claim 11, wherein the identifier is located on the rear side of the cabinet in a location concealed from view by the attached shipping attachment assembly.

14. The front-loading laundry appliance of claim 11, wherein the shipping bolt includes a bolt body, a threaded portion, and a connecting portion, the connecting portion connecting the bolt body to the threaded portion.

15. The front-loading laundry appliance of claim 14, wherein at the point of connection between the connecting portion and the threaded portion of the shipping bolt, the diameter of the threaded portion is greater than the diameter of the connecting portion such that the threaded portion defines a lip.

16. The front-loading laundry appliance of claim 15, wherein the shipping bolt spacer has a first end and a second end, a through hole extending from the first end to the second end, and a plurality of elastic flanges situated at the second end that are configured to flex radially outward upon the application of a force in the direction from the first end to the second end and to return to their original position in the absence of the application of such force.

17. The front-loading laundry appliance of claim 16, wherein each of the plurality of flanges includes a first end and a second end, the first end of each of the plurality of flanges connected to the shipping bolt space, and distance between each of the second ends of the plurality of flange being less than the diameter of the threaded portion of the shipping bolt such that the plurality of flanges prevent removal of the shipping bolt.

18. The front-loading laundry appliance of claim 11, wherein the identifier is a QR code.

19. The front-loading laundry appliance of claim 11, wherein the identifier is a bar code.

20. The front-loading laundry appliance of claim 11, wherein the identifier is an alpha-numeric code.

* * * * *